United States Patent [19]
Wilson

[11] Patent Number: 5,588,289
[45] Date of Patent: Dec. 31, 1996

[54] GARDEN CUTTING TOOLS

[76] Inventor: Graham J. Wilson, Brownroyd, 263 Pensby Rd., Pensby, Wirral, L61 5UA, England

[21] Appl. No.: 336,751

[22] Filed: Nov. 8, 1994

[51] Int. Cl.[6] .................................................. A01D 55/00
[52] U.S. Cl. .......................... 56/13.1; 56/233; 56/239; 56/DIG. 8; 30/124; 30/264; 30/296.1
[58] Field of Search ............................ 56/13.1, 13.2, 56/16.4 R, 233, 235, 239, DIG. 8, 12.9; 30/124, 125, 264, 265, 296.1

[56] References Cited

U.S. PATENT DOCUMENTS

| | | | |
|---|---|---|---|
| 1,614,386 | 1/1927 | Peebles et al. | 56/DIG. 8 |
| 1,723,151 | 8/1929 | Goodwin | 56/13.2 |
| 3,846,963 | 11/1974 | Pedigo | 56/DIG. 8 |
| 4,379,385 | 4/1983 | Reinhall | 56/16.6 |
| 4,696,108 | 9/1987 | Zerrer et al. | 30/296.1 |
| 4,964,472 | 10/1990 | Cleworth | 56/239 |

FOREIGN PATENT DOCUMENTS

| | | |
|---|---|---|
| 773208 | 4/1957 | United Kingdom . |
| WO91/13539 | 9/1991 | WIPO . |

*Primary Examiner*—Terry Lee Melius
*Assistant Examiner*—Heather Shackelford
*Attorney, Agent, or Firm*—Foley & Lardner

[57] ABSTRACT

The present specification discloses a cutting tool for use in the garden and workshops having a body (A) which houses a screw impeller (9) that can be driven by a motor (23). The screw impeller (9) being arranged to move waste along a flow path extending through the body (A) from an inlet (11) to an outlet (13), the outlet (13) being connectable to a receptacle which can then entrap any material so moved. A rotating cutting blade (35,41) controlled by the screw impeller (9) being located adjacent to the inlet (11) to act with a fixed cutting blade (31,37) to cut material projecting therebetween, which cut material is entrained through the body (A) by the screw impeller (9) to the receptacle.

38 Claims, 13 Drawing Sheets

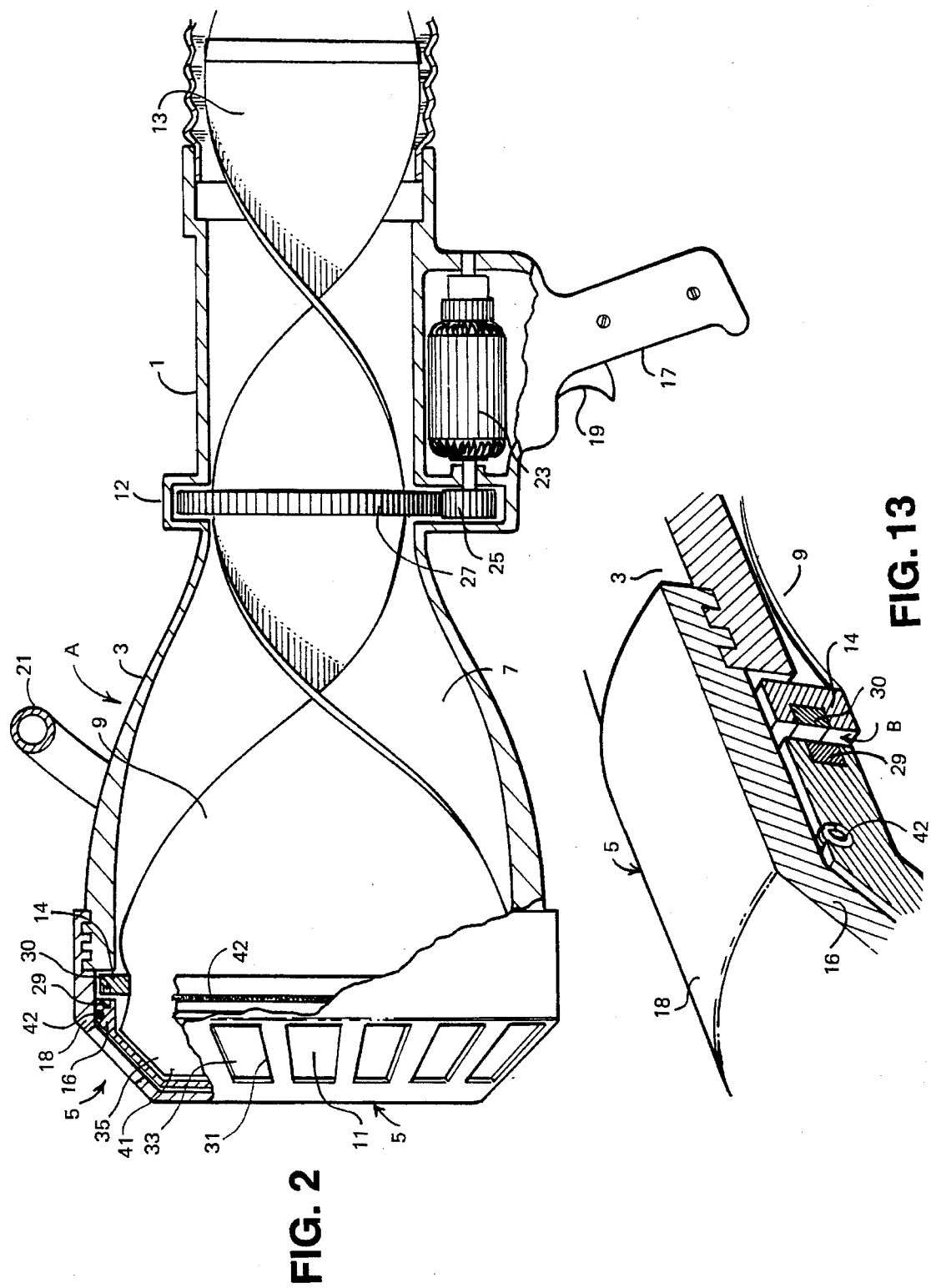

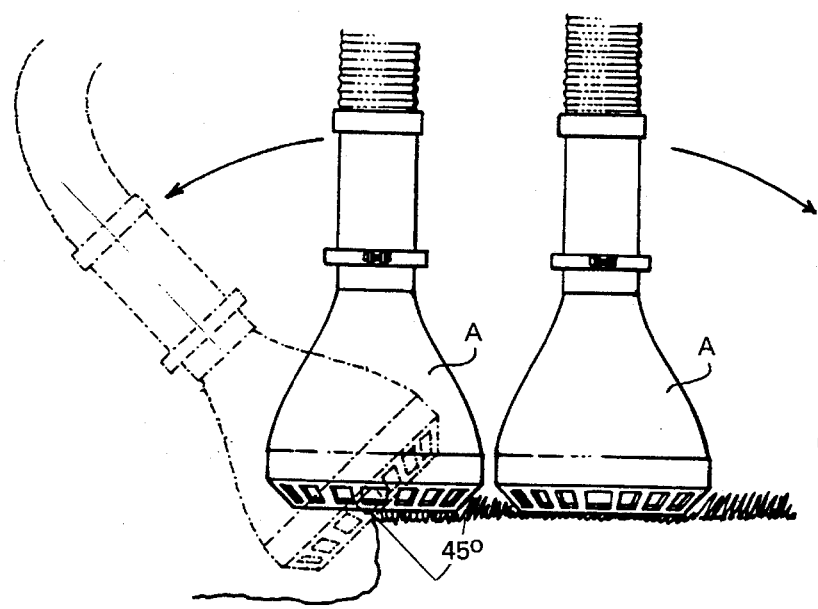
FIG. 4a
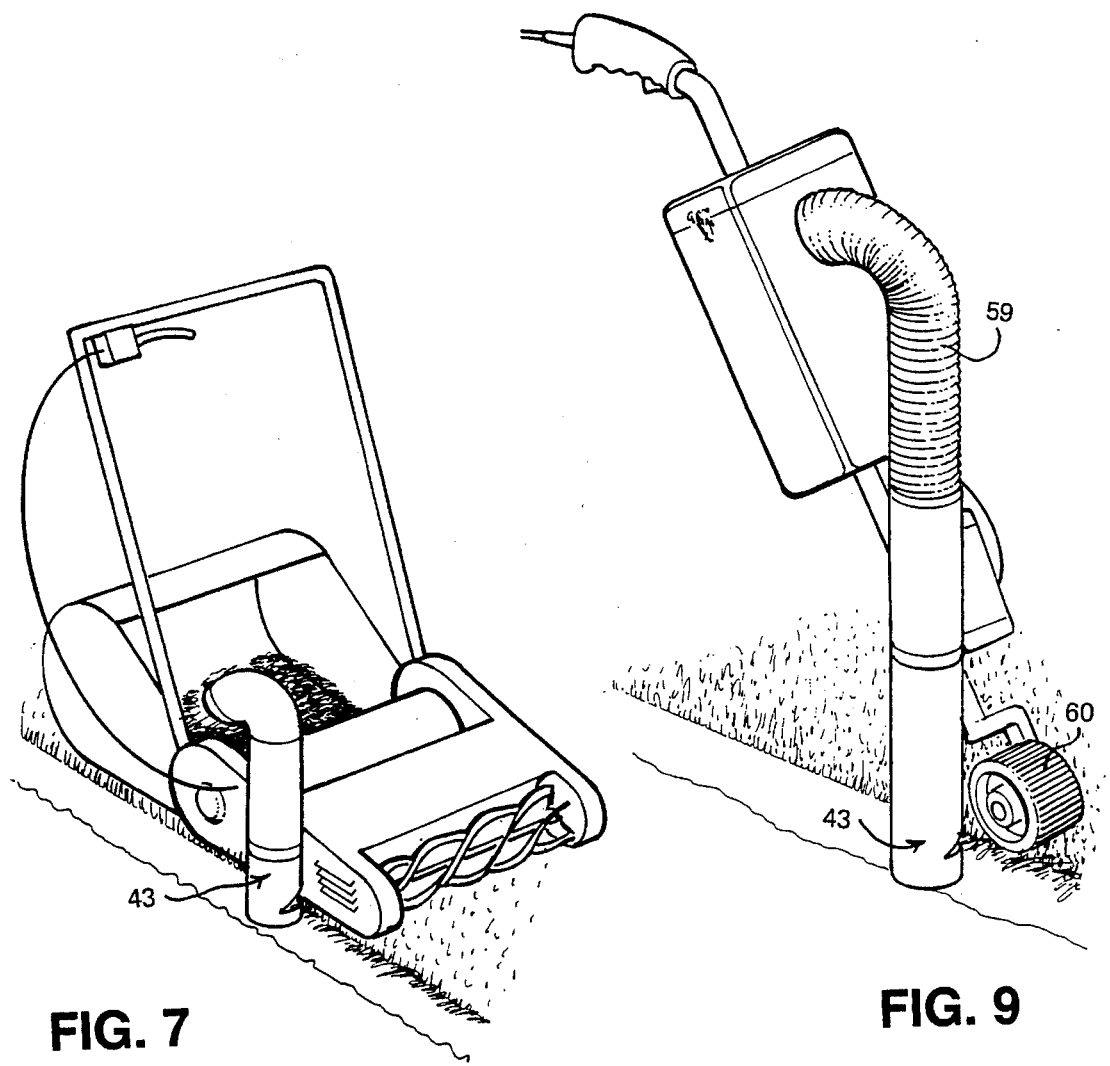
FIG. 7
FIG. 9

GARDEN CUTTING TOOLS

The present invention relates to a cutting tool for use in the garden or workshops.

In particular, the present invention relates to a power tool for use in cutting a garden hedge or lawn edge, pruning and general removal of garden debris and workshop swarf/waste.

Hedge cutting tools presently available on the market usually use a scissor action. Such tools are either manually operable or power operated. However, either type of tool produces waste cuttings which have to be brushed up and usually collected by hand. Sections of the hedge can die in areas where cuttings are left to decay. This also applies to flower beds where decaying hedge cuttings non only look unsightly but can have a detrimental affect on the growth of plants.

Lawn edge cutting tools presently available on the market are usually long handled, manually operated scissor mechanisms, which cut the grass along the edge of the lawn and deposit the waste cuttings on the adjacent area, e.g., a path or flower bed. Power operated scissor and rotary cutting action tools are available for cutting edges, though these also deposit the waste cuttings on the adjacent path or flower bed. The depositing of grass cuttings on the flower bed is undesirable as again, they not only look unsightly, but can germinate.

Pruners presently available on the market are manually operated scissor action secateurs. The operation requires the stem of, for example, a rose to be held in one hand whilst cutting with the other. The waste material is then deposited into a bag or receptacle.

The main problems associated with this operation are:

(a) the handling of the rose stems is very awkward and can lead to minor injury of the hands by the barbs/thorns, causing splinters and scratching.

(b) the pruned lengths of rose stems are difficult to handle without further cutting for the compost heap or for location in a plastic bag ready for disposal.

(c) plastic bags can be punctured and damaged by the thorns; and (d) the pruning operation is relatively time consuming and labour intensive.

Strimmers presently available on the market for cutting long grass adjacent to obstacles such as fences and trees, are power operated rotary cutting devices, which cut the long grass by means of a flexible plastic thread which spins at high speed and cuts the grass by a lashing action. The cut grass is spread out over the adjacent area of pathway, flower bed or lawn and is normally removed by hand brushing or raking into a pile before depositing into a suitable receptacle.

The most common method presently used for removing grass cuttings from either flower beds or a path is to brush or collect by hand, both of which methods can be time consuming and physically tiring.

Present devices on the market for use in removing garden debris such as twigs and leaves from paths, flower beds and gutters rely solely on the principle of a vacuum cleaner to suck up the waste and are limited in their function on two counts:

(1) They have difficulty in coping with large amounts of wet items such as leaves, which tend to stick to the sides of the tube walls, and cause blocking.

(2) They are limited to removing waste of a size smaller than their inlet aperture.

Further, the task of removing waste from metal, machine or woodwork shop floors is presently carried out either by means of brushing and shovelling or using industrial vacuum cleaners.

The manual means is time consuming and labour intensive and tends to be inefficient as the swarf can be in a variety of forms. The waste can be a mix of sawdust, (very fine light waste) plane shavings or chissel chippings and possibly fairly large wood 'off-cuts'. With metal swarf this can take the form of long continuous spirals of stainless steel lathe waste, which is very sharp and saturated in liquid coolant, and requires careful handling by operators wearing special protective clothing. Milling and shaping machine waste again covered in coolant, and metal filings are very difficult to remove efficiently by hand.

Vacuum cleaners presently available are limited to removing relatively small items of waste which are smaller than the inlet tube. As the waste can be of odd sizes and shapes, the cleaner tube tends to get regularly blocked. Also, any wet waste can stick to the tube sides causing blockage. In addition, vacuum cleaners are not capable of handling long spiral lengths of steel swarf generated by lathes etc, saturated in coolant oils, this type of swarf has to be cut manually before removal.

The aim of the present invention is to provide a power operated cutting tool for use in cutting hedges and edges of lawns, pruning of especially rose trees and the general removal of waste whereby the waste cuttings are cut and sheared and automatically collected, as the cutting is affected.

According to the present invention, there is provided a cutting tool for use in the garden and workshops, comprising a body which houses a screw impeller which can be driven by a motor, the screw impeller being arranged to move waste along a flow path extending through the body from an inlet to an outlet, the outlet being connectable to a receptacle which can then entrap any material moved through the body, a rotating cutting blade being located adjacent to the said inlet to act with a fixed cutting blade to cut material projecting therebetween, which cut material is entrained through said body by the screw impeller.

By using a tool constructed according to the present invention, the waste cuttings from either the hedge, lawn edge, pruned tree or floor area are drawn by the screw impeller along the flow path into the receptacle, the screw impeller forcing the waste along the entire length of the flow path from the inlet to the outlet and therefore ensuring that wet waste does not stick to the sides of the tubes. Further, as the waste is drawn through the inlet it is sheared into many small pieces before entering a transfer tube connected to the receptacle, this therefore reducing large items of debris to a size commensurate with the transfer tube size and facilitating the transfer. Thus the tedious task of subsequently brushing up and manually collecting such waste cuttings is obviated.

In one embodiment of the present invention the tool comprises a generally barrel-shaped body moulded out of a plastic or metal material, the body having a detachable cone-shaped end having fixed cutting blades and a guard portion at one axial end thereof. The body houses an electric motor in a closed compartment and integral screw impeller and cutting blades. The electric motor is arranged to belt drive or directly drive the screw impeller and rotary cutting blades via gears. The rotatable cutting blade is an integral part of the end of the screw impeller and is arranged in the guard portion of the body to rotate about the body axis. Thus, by offering up the body perpendicular to the hedge surface, the motor can be energised and the cutting action takes place whilst the tool is moved by hand over the surface of the hedge.

The tool used as a hedge cutter is positioned so that the leaves and stems extend through the radial apertures, the leaves and stems being then sheared between the rotating and fixed cutting blades and immediately carried into the receptacle essentially by the action of the screw pump. The screw impeller may be extended in length through the flexible tube by using a flexible plastic (e.g., nylon) material, formed into a helix. This would ensure in the case of heavier and/or wet waste material, continuous physical conveyance from the cutters to the receptacle.

To assist in entraining cut material along the body of the tool and into the receptacle an air flow can be provided along the body in the direction of flow towards the receptacle, the receptacle then having to be vented appropriately. This air flow may be provided by a fan arrangement provided in the drive shaft of the electric motor, with the fan arrangement forcing air into the central region of the length of the body of the tool, with the air flowing towards the receptacle and then drawing in further air via the radial apertures. Alternatively the air flow may be forced along a passage in a central shaft supporting the screw impeller, towards the radial apertures, the end region of the screw impeller having rearwardly directed outlets so that the forced in flow then travels back along the body towards the receptacle, entraining the cut material.

To convert the hedge cutter into the lawn edge cutting tool, the conical end along with its tapered screw impeller is disengaged (unscrewed) from the main body and replaced by a parallel sided tube and its associated cylindrical screw impeller, with a slot cut in the side which acts as a static cutting blade.

The cutting action takes place between the static blade in the side of the tube and the side of the screw impeller which forms the rotating cutting blade. Thus, by locating the body with its longitudinal axis vertical to the lawn edge, and with the blades of the cutting assembly adjacent to the lawn edge, the motor can be energised and the tool moved along parallel to the lawn edge. To aid the movement of the tool, wheels can be provided, thus the tool can be easily pushed along. There is also a guard provided which can be either opened and closed manually or automatically via a magnetic clutch mechanism coupled to the rotary cutting blade. In auto mode as the blade/screw impeller rotates, the guard opens and the grass is drawn into the side of the main body and sheared between the static blade and the screw impeller edge, the waste cuttings are then propelled up the body and along the flexible tube, before depositing into a receptacle secured to the handle. The receptacle is vented and may be either of the disposable type or merely capable of being opened and emptied.

Whilst the above described embodiment of the present invention is designed solely for cutting hedges and lawn edges, the cutting tool of the present invention may be incorporated in a garden mower if solely the lawn edge trimming facility is required. In such a construction the cutting assembly may be mounted on a pivotal arm so that the mower can be used conventionally to cut the surface of a lawn with the cutting assembly retracted out of the way. As the mower is pushed or powered along the edge of the lawn, the cutting assembly can be lowered to cut the lawn edge. The pivotal movement of the cutting assembly is preferably remotely controlled via a Bowden cable and a control lever mounted on the mower handle. If desired, the screw impeller and receptacle in this latter construction may also collect the grass cutting from normal mower operations as well as the edge cuttings.

Further attachments may be fitted to the end of the hedge cutting tool assembly, i.e. nozzles to provide smaller apertures for removal of leaves etc., around plants in flower beds.

Alternatively, the end cap can be removed from the lawn edge cutter, thus enabling the removal of leaves etc. with this method.

Further the cutting tool of the present invention may be used as a pruner especially suitable for use in pruning ornamental bushes and rose trees. For such usage the cutting tool takes the form of a disc which is rotatable about its central axis by a motor, preferably an electric motor, the disc having an offset cutting aperture formed therein which at least overlaps a further cutting aperture provided in a wall of a casing during part of each rotation of the disc. The respective apertures are preferably coaxial with each other at one rotational portion of the disc. Further the apertures preferably have profiled edges to facilitate cutting/shearing. Also the said cutting aperture may have a shape which narrows circumferentially with respect to the rotation of said disc, this shape facilitating the cutting/shearing action. In use the stem of, for example, a rose is engaged through said further cutting aperture and also said cutting aperture as the rotating disc approaches and overlaps said further cutting aperture. Continued rotation of the disc causes the stem to be cut/sheared. To guide the stem into said further cutting aperture a conical or part cutaway guide is preferably provided in the outside of said casing over the further cutting aperture, the part cutaway guide enabling a user of the tool to more easily see the location of cut/shear so that the desired cut is achieved. Also, within the casing, to transfer the cut stems away from the cutting disc and into a collection receptacle, the screw impeller is secured to the cutting disc so as to be coaxially rotatable therewith. Either the cutting disc or an axial section of the impeller is provided with a drive belt/chain gripping surface eg. a toothed surface, with a drive belt/chain passing therearound, the drive belt/chain also passing around a smaller diameter belt/chain drive wheel which is connectable to an electric motor eg. a power drill chuck. Thus by virtue of the smaller diameter belt/chain drive the cutting disc rotates relatively quietly at a relatively slow speed but at a high torque resulting in the plant stem being cut into small handlable pellets which are physically transferred through the casing by the screw impeller, and into the collection receptacle. By virtue of the relatively slow speed of the screw impeller the collection receptacle does not require vent holes, this having the advantage that a user of the cutting tool remains relatively clean as compared to vented collection devices where dust is blown around in the surrounding atmosphere. Also the collection receptacle may be a conventional plastic bin bag which can be readily disposed of when a pruning operation has been completed without the need for the cut stems to be transferred, this in the case of rose tree stems obviating the possibility of the sharp thorns present on such stems causing injury. A fresh disposable bin bag may then be used. Further, if the cut stems are to be used as compost the disposable bag may itself be made of a biodegradable material.

To provide the facility for cutting grass close to trees, fences and other obstructions, a handle can be attached to the hedge cutter assembly. This configuration has the advantage over presently available tools that perform this task, i.e. strimmers, of removing the grass cuttings and depositing them in a receptacle, instead of on the ground nearby.

In a further embodiment of the present invention two hedge cutters are mounted face down alongside each other in a wheeled frame, to perform the duties of a lawn mower. The assembly can be either arranged to facilitate the removal of one or both of the hedge cutters, enabling them to be used for that purpose as portable equipment or a more permanent configuration can be arranged, where one central power unit (e.g. electric motor) is permanently fixed to drive both screw pumps/cutting blade assemblies. With either configuration the present embodiment has the advantage over presently available lawn cutters in that it vacuums the waste up and deposits it into a bin bag or other receptacle for immediate disposal. The same assembly can be run over paths etc., and will draw up waste of a variety of shapes, sizes and wetness without having a detrimental affect on the machine assembly itself.

The efficiency of removing waste from a floor surface can be further improved by replacing the hedge/grass cutting head, with a brush/shredding head. With this arrangement manufactured in metal, the machine can be used to remove waste from wood/metal workshop floors, by brushing and projecting the waste material into the path of the shredder assembly, before being sheared and collected by the screw pump. The present arrangement can be increased in capacity by simply adding additional screw impeller/cutter assembly modules and possibly a seat for the operator along with a traction motor fitted to the driving wheels.

The present invention thus provides a cutting and collecting assembly which is robust and will shear waste material in any form both wet and dry, (the only limiting factor being the shearing strength of the cutting blades) and which will collect and deposit the sheared material into a convenient receptacle.

The present invention will now be further described, by way of example, with reference to the accompanying drawings, in which:

FIG. 2 is a cross-sectional side view of one embodiment of the present invention shown in FIG. 1;

FIG. 4a is a partial view of the embodiment of FIG. 4 converted for lawn edge cutting;

FIG. 7 is a lawn edge cutting adaptation of the present invention for lawn mowers;

FIG. 9 is a lawn edge cutting tool according to the present invention in operational mode;

FIG. 13 is a cutaway view of the magnetic clutch mechanism used in the embodiment of FIG. 1.

Figure 1:
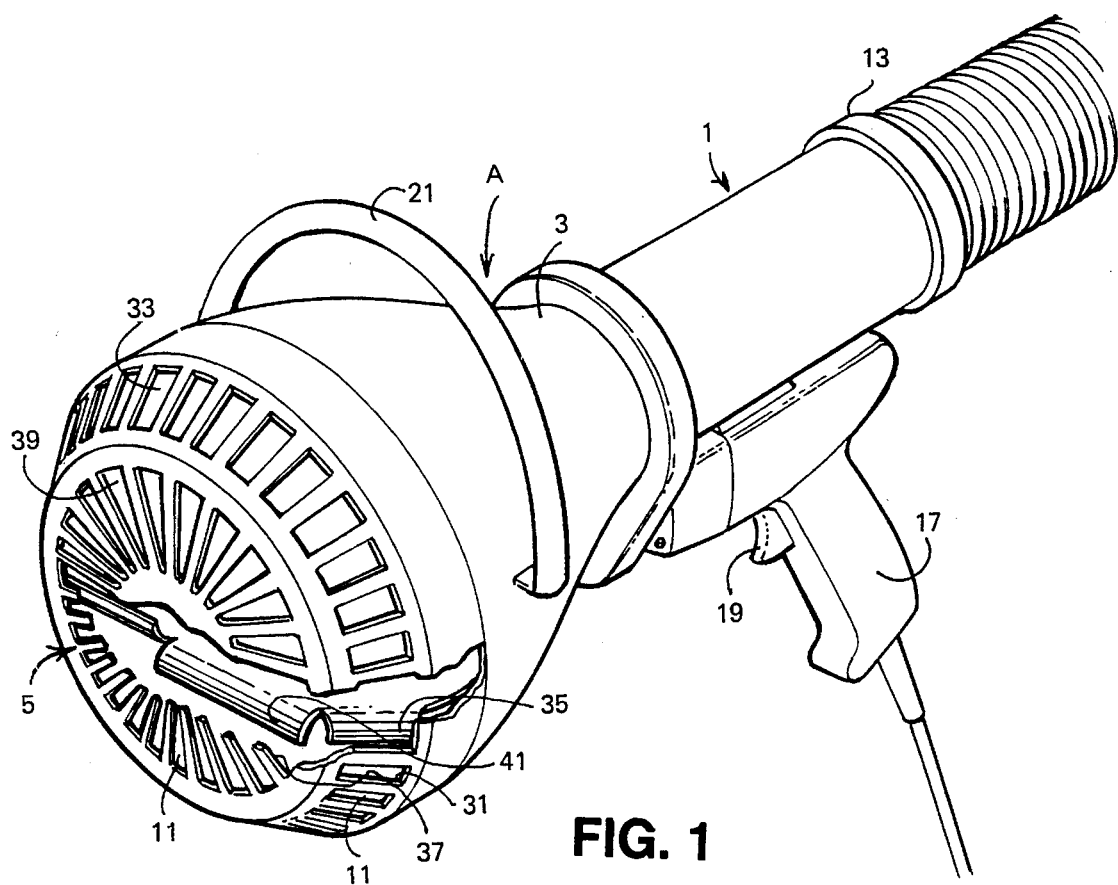
FIG. 1 is a perspective, partially cutaway, view of a preferred embodiment of the present invention in the hedge cutting configuration.
Figure 8:
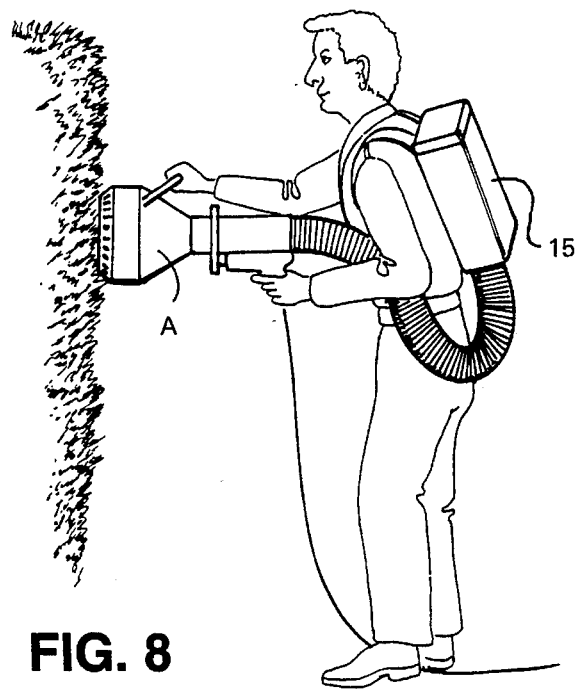
FIG. 8 is a hedge cutting tool according to the present invention in operational mode.

One embodiment of the present invention shown in FIGS. 1 and 2 of the accompanying drawings comprises a body A formed by a generally cylindrical shaped housing 1, a cone shaped attachment 3 and a cutting guard assembly 5, which together define a closed compartment 7, in which a helical/spiral screw cutter impeller 9 is located. A body A defines a flow path which has an inlet 11 and an outlet 13, the outlet 13 being detachedly connectable to a disposable receptacle 15 which can be supported on an operators back, similar to a haversack (FIG. 8). A handle 17 is provided which is of a pistol grip design, with an integral switch 19. In addition there is a detachable handle 21 offered for ease of operation. With the hedge cutter assembly of FIGS. 1 and 2 the operator presses the starter switch 19 which energises a motor 23 which in turn rotates via gears 25 and 27, the screw cutter impeller 9. The rotation of the screw impeller 9 causes a rotatable inner member 16 of the guard assembly 5 to rotate relative to the cone shaped attachment 3 to an open position, via a clutch mechanism 29, 30 see FIG. 13). The rotatable inner member 16 is biassed by springs 42 to a position wherein said inner member 16 closes the inlet 11. A bearing ring 14 supporting the end of the screw impeller 9 has a steel inset 30 which forms a flux coupling with a number of fixed magnets 29 mounted in said rotatable inner member 16 of the guard assembly 5. The magnetic flux coupling across air gap B causes the inner member 16 of the guard assembly 5 to follow the rotation of the bearing ring 14 as the impeller 9 rotates so that the inner member 16 opens the inlet 11. When the impeller 9 stops, the springs 42 close the inlet 11. With the impeller 9 rotating and the inlet 11 open the exposed cutting assembly at the radial end of the hedge cutter, is now ready for offering up to the hedge. Cutting is performed by edges 31, 37 of openings 33, 39 in the guard assembly 5 which cut with the end edge portions 35, 41 of the screw cutter impeller 9, which end edge portions 35, 41 are bent in the direction of impeller rotation to facilitate cutting. Thus by passing the guard 5 over a hedge surface, the leaves and twigs extend through the openings 33 and 39, and are cut off and drawn into the compartment 7. The inner member 16 of the guard assembly 5 is rotatably located within a fixed outer member 18 of the guard assembly 5, and as explained hereabove the said inner member 16 is rotated into the open position on energisation of the motor 23 by the coupling of the (magnetic) clutch mechanism 29, 39 with the screw impeller 9. On de-energisation of the motor 23 and hence deceleration of the rotary screw impeller to a stationary position, the inner member of the guard assembly 5 is returned automatically to the closed position by the spring return mechanisms 42 mounted in recesses around the perimeter of an outer fixed member 18 of the guard assembly 5.

An additional feature of the cutting assembly is the ability for the fixed blades i.e. the edges 31, 37, to flex/move away from the rotating blades i.e. edges 35, 41, enabling large hard items to pass between, thus reducing damage to the cutting blades.

To use the tool for lawn edge cutting (see FIG. 3), the conical end 3, front section of the screw impeller 9, the guard 5 and cutting assembly, are removed from the cylindrical housing 1 which includes the drive unit 23, by disengaging the screw lock at 12. The whole of this forward assembly can then be removed and replaced by a cylindrical tube 43 incorporating a cutting assembly 45. In attaching the cutting assembly 45 comprising a cutter screw impeller 47 to which a drive gear 49 is attached, this gear 49 being engaged with drive gear 51 of the motor 23. The tubular housing 43 can next be threaded over the cutter screw impeller 47 and locked to the drive system using a locking thread 53. As in the case of the hedge cutting cone assembly, the cutter screw impeller 47 is held in position by bearings 55. A long handle 57 is then connected to the unit which has a receptacle attached, and a long flexible tube 59 is connected between the screw impeller 47 and the receptacle enabling the waste grass cuttings to be transferred. Also, there is a wheel 60 attached to the side of the cutting tube 43 which enables the edge cutter to be run over the surface of the lawn smoothly, whilst the cutting action takes place. The lawn edge is cut by the grass leaves projecting into an opening on the side of the tube 43, the edge 61 of which opening forms a fixed blade which acts with the edge of the cutter screw impeller 47 to cut the grass leaves. The cut leaves are then propelled along the body 43 and along tube 59 into the said receptacle. The process continues as the device is pushed along the edge of the lawn.

Figure 4:
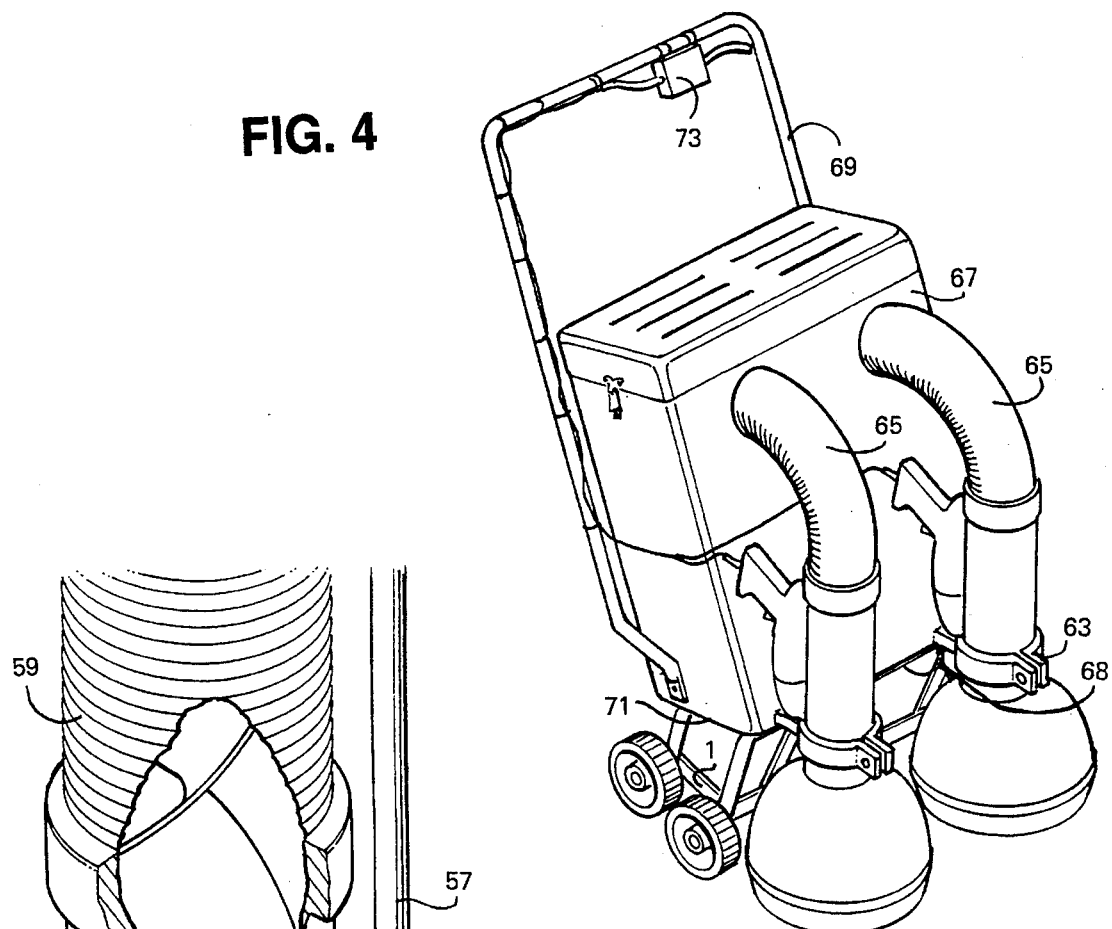
FIG. 4 is a perspective view of a further embodiment of the present invention in the lawn mower configuration.

FIGS. 4 and 4a illustrate two hedge cutting units as per FIG. 1 assembled as a lawn mower. The frame 1 as shown, is designed to accommodate two hedge cutting assemblies, although larger frames can be arranged to house additional units commensurate with the area to be covered. The hedge cutters are clamped in the vertical position with clips 63. The tubes 65 from each assembly, fit into a waste receptacle 67 attached to the handle 69. The electrical supplies to the units is from one common line 71 via a switch 73 on the handle. In operation the switch 73 is squeezed by the operator whilst at the same time pushing the unit over the surface of the lawn. The rotary cutters draw the grass through the main cutting assembly, shearing it and projecting it through the hoses 65 into the receptacle 67. An additional feature of this assembly is the pivotal carriers 68 which enable the cutters to be angled at 45 degrees for cutting the lawn edges on either side—see FIG. 4a.

Figure 5:
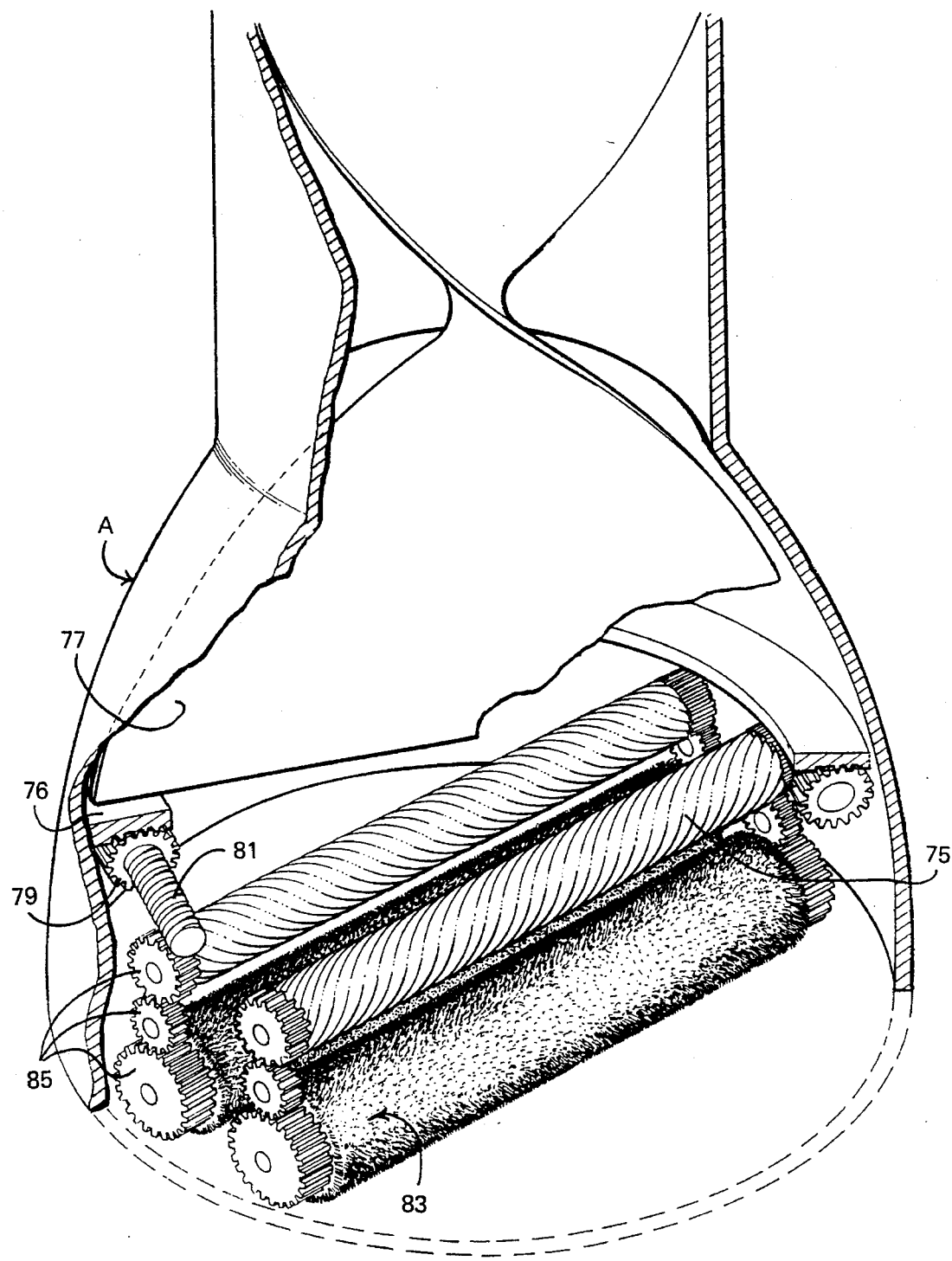
FIG. 5 is a cutaway perspective view of a brush adaptation of the present invention.

The above configuration can also be adapted for use as a machine for removing waste from the surface of paths and workshop floors. The arrangement can be improved with an additional brush and shredder assembly, see FIG. 5, to sweep and shred, whilst at the same time removing the waste. The rotary shredders 75 are driven by a gear 76 mounted on the perimeter of the screw impeller 77, which drives jockey gears 79, which are directly coupled to a worm gear 81 that drives the shredders/cutters 75 which in turn drive brushes 83 via gears 85. The brush action sweeps up the swarf, and projects it into the path of the shredders, reducing the larger items of swarf, before being sheared by the rotary cutting blades and transferred to the receptacle by the screw impeller 77.

Figure 6:
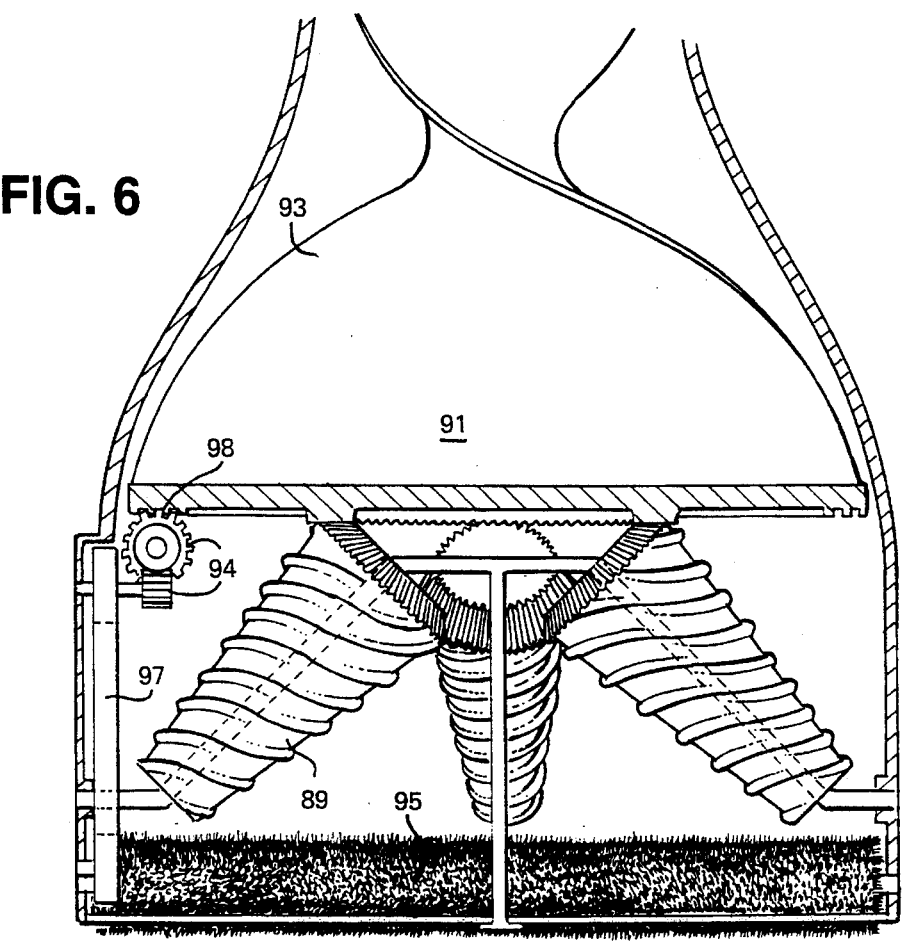
FIG. 6 is a cutaway perspective view of a shredder adaptation of the present invention.

For applications where the waste and debris to be removed is particularly hard and tough, i.e., blocks of wood or metal, an additional cutting assembly is offered, as shown in FIG. 6.

In this embodiment the shredding cutters 89 are driven by a gear 91 fixed to the screw impeller 93 and brushes 95 are driven via a belt 97 from a toothed ring 98 on the end of the impeller 93 and gear train 94. This arrangement provides additional shredding cutters 89 to break down large items of waste before entering the screw impeller 93.

Figure 3:
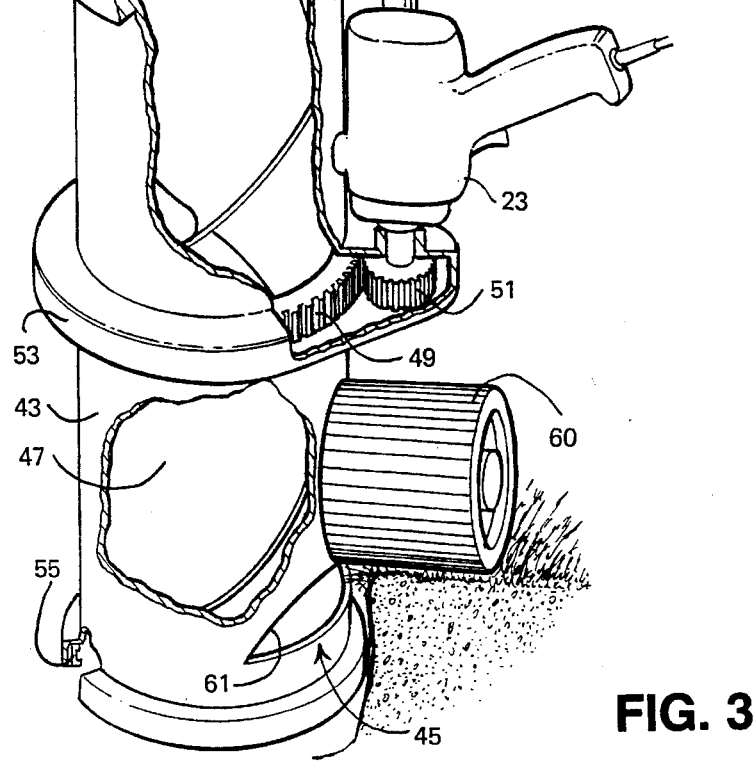
FIG. 3 is a cutaway perspective view of another embodiment of the present invention in the lawn edge cutting configuration.

FIGS. 7 and 9 of the accompanying drawings illustrate the lawn edge cutting embodiment of FIG. 3 attached to a conventional lawn mower (FIG. 7) and constructed as an independent piece of equipment (FIG. 9) for independent use by an operator. FIG. 8 of the accompanying drawings illustrates the hedge cutting embodiment of FIGS. 1 and 2 of the accompanying drawings in one possible user mode.

Figure 10:
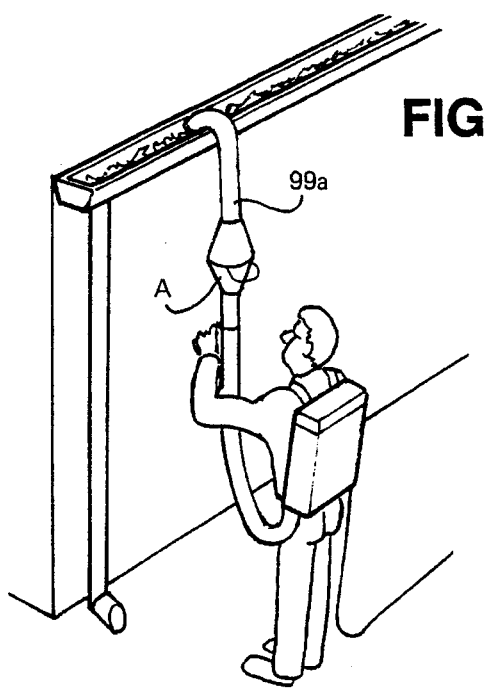
FIG. 10 is a still further embodiment of the present invention suitable for gutter cleaning.

FIG. 10 of the accompanying drawings shows an embodiment of the present invention wherein an inlet duct 99a enables the tool to be used to easily clean out gutters.

Figure 11:
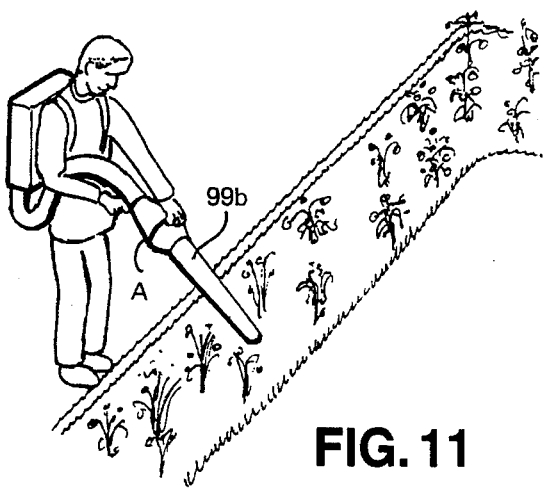
FIG. 11 is a still further embodiment of the present invention for use in treating flower beds.

FIG. 11 of the accompanying drawings shows an embodiment of the present invention wherein an inlet duct 99b enables the tool to be used to clear, cut and collect waste from, for example, a flower bed.

Figure 12:
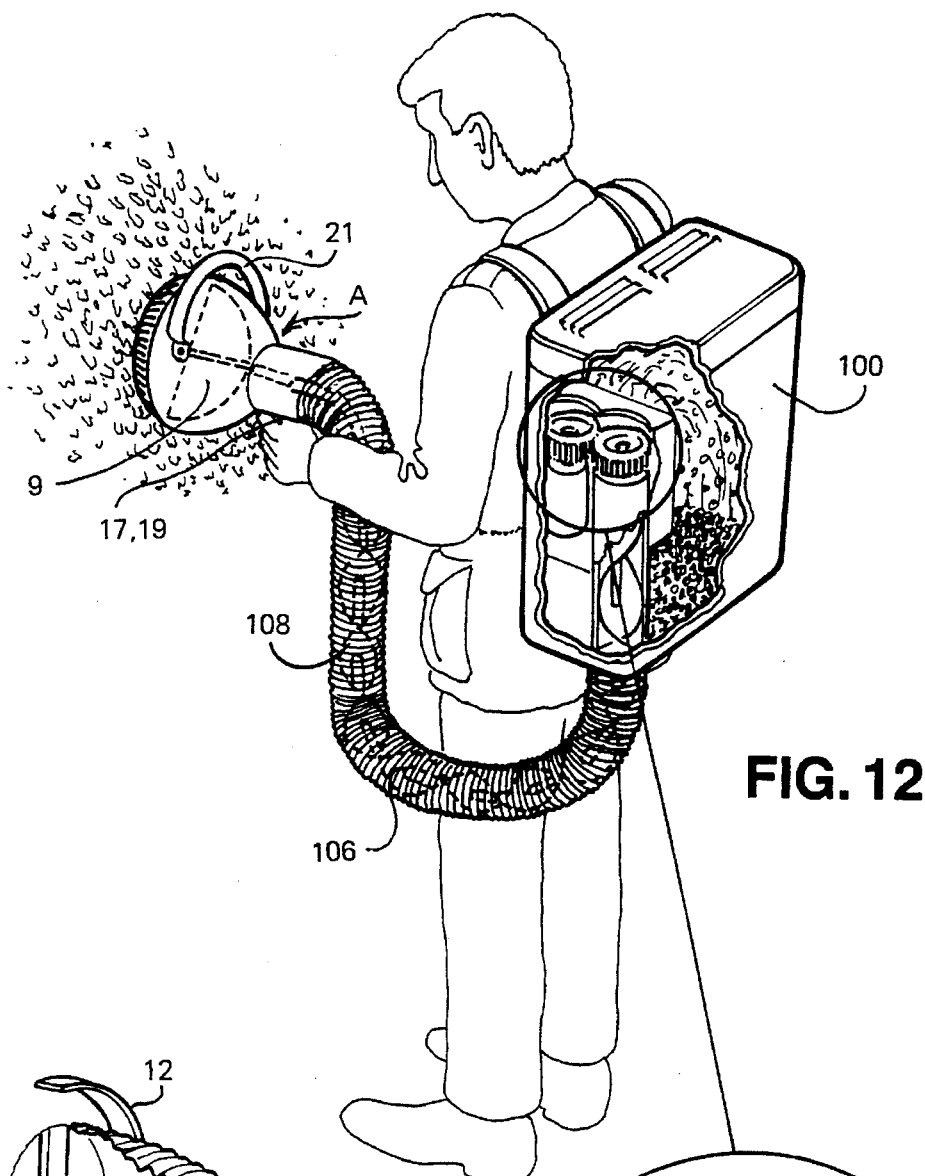
FIG. 12 is a cutaway perspective view of a hedge cutter constructed according to the present invention, shown in operational mode, with the motor located in the back pack.
Figure 12A:
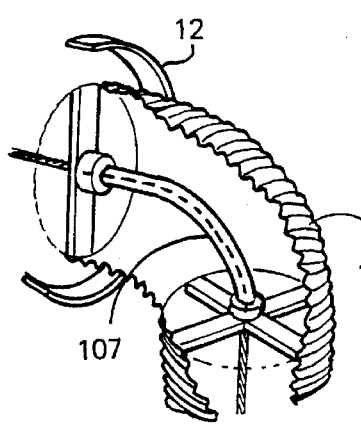
FIGS. 12a and 12b show enlarged details of the embodiment of FIG. 12.
Figure 12B:
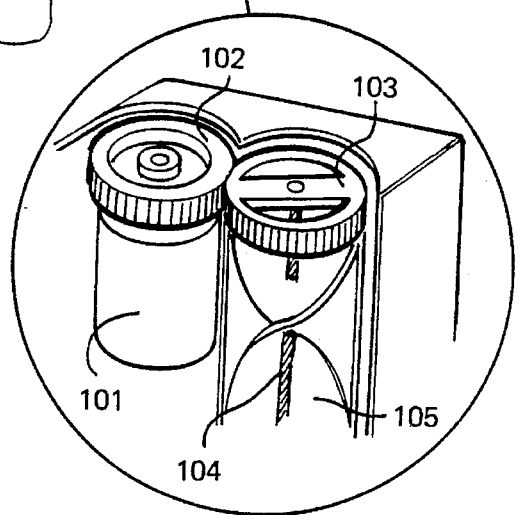

FIG. 12 of the accompanying drawings shows an embodiment of the present invention wherein the motor 101 is mounted in the back pack 100 to thus reduce the hand held weight of the tool. With the hedge cutter assembly of FIG. 12, an operator presses the switch 19 which energises a motor 101 via cable 108, which in turn rotates via gears 102 and 103 (FIG. 12b), the Bowden cable 104 and flexible screw impeller 105. The steel Bowden cable fixed to the centre of the flexible screw impeller, provides the impeller with additional strength to transmit the torque from motor 101 to the helical/spiral screw cutter impeller 9. In the portion of flexible hose 106 attached to the main body A the flexible screw impeller is omitted (see FIG. 12a) and the driving torque is transmitted via the sheathed Bowden cable 107 to provide maximum flexibility. The main body and guard assembly remains the same as that described previously with regard to FIG. 1 and is coupled to the flexible hose via the screw lock 12.

Figure 14:
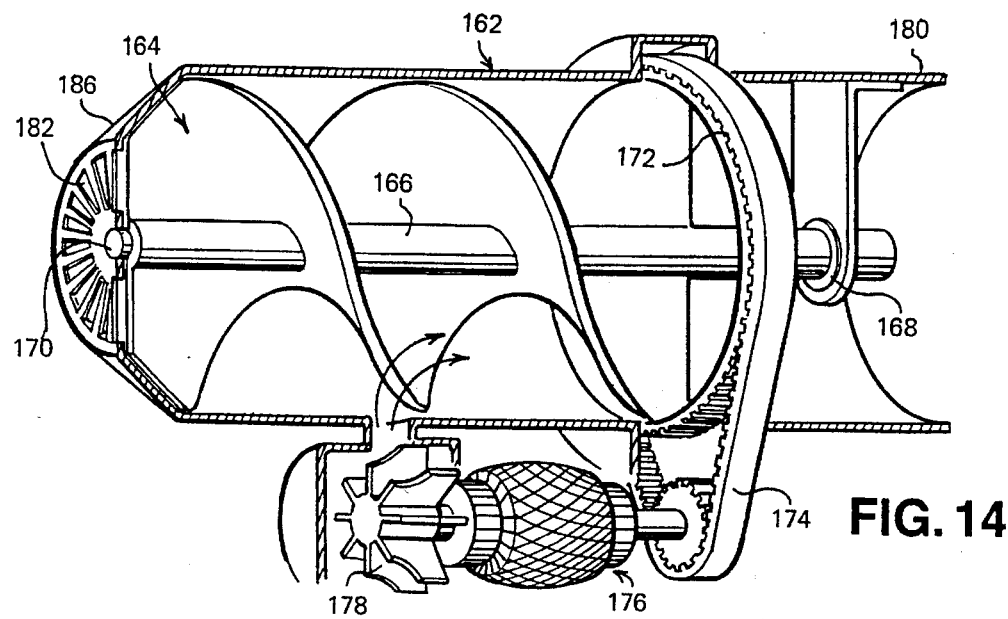
FIG. 14 is a cutaway view of part of a modified embodiment of the hedge cutter of FIG. 1.

FIG. 14 of the accompanying drawings is a partially cutaway view of a modified form of the hedge trimmer of FIG. 1, with the hedge trimmer having a cylindrical body 162 within which a screw/helix impeller 164 is freely rotatably supported, the impeller 164 having a central shaft 166 freely rotatably mounted as at 168 and 170. A toothed drive ring 172 is mounted coaxially on a part of the periphery of the screw impeller 164 and is connected by a continuous belt 174 to an electric drive motor 176 located outside the cylindrical body 162, The electric motor 176 also drives an air flow induction arrangement in the form of a fan 178 which forces a flow of air into the central region of the length of the cylindrical body 162, the air flow being directed towards the receptacle end 180 of the body 162 and thus drawing in air through the apertures 182 to thereby entrain material cut by the apertures 182 and the cutting edge end of the impeller 164, along the body 162 and aid the action of the impeller 164.

Figure 15:
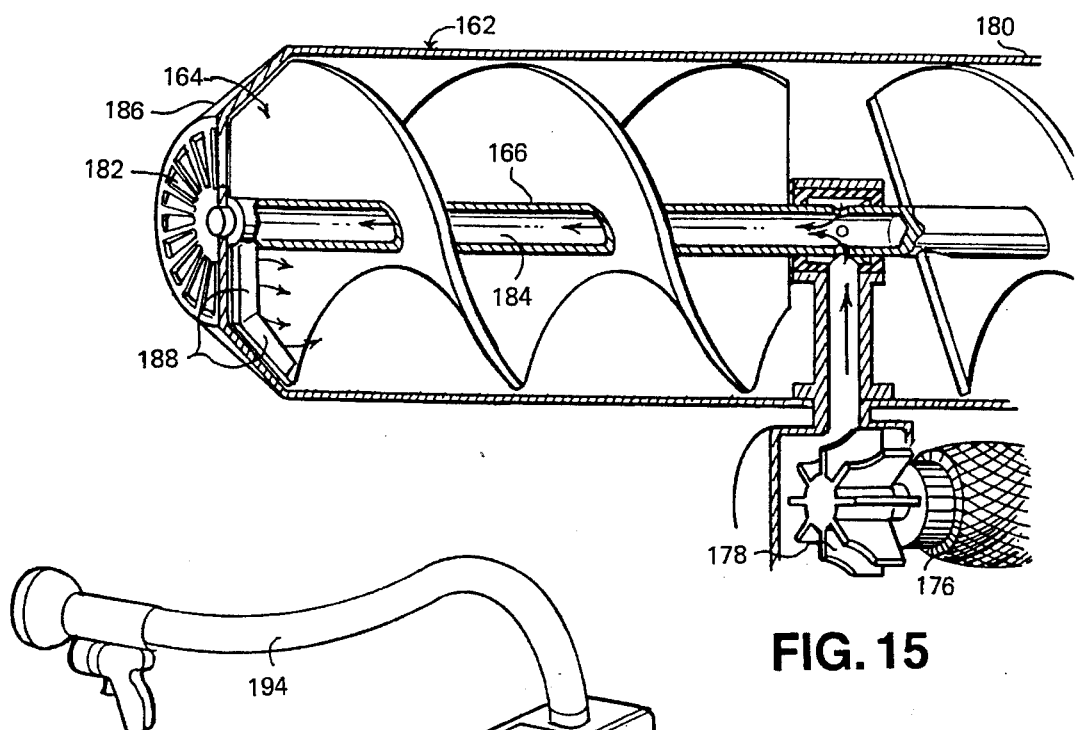
FIG. 15 is a cutaway view of part of a further modified embodiment of the hedge cutter of FIG. 1.

FIG. 15 of the accompanying drawings shows a partially cutaway view of a further modified form of the hedge trimmer of FIG. 1, this embodiment differing from the embodiment of FIG. 14 solely by virtue of the forced air flow being directed along a hollow portion 184 of the central shaft 166 towards the cutting end 186 of the screw impeller 164. The cutting end 186 of the screw impeller 164 is provided with rearwardly directed air outlets 188 so that the forced air flows along the major part of the length of the cylindrical body 162, further aiding the entrainment of the cut material.

Figure 16:
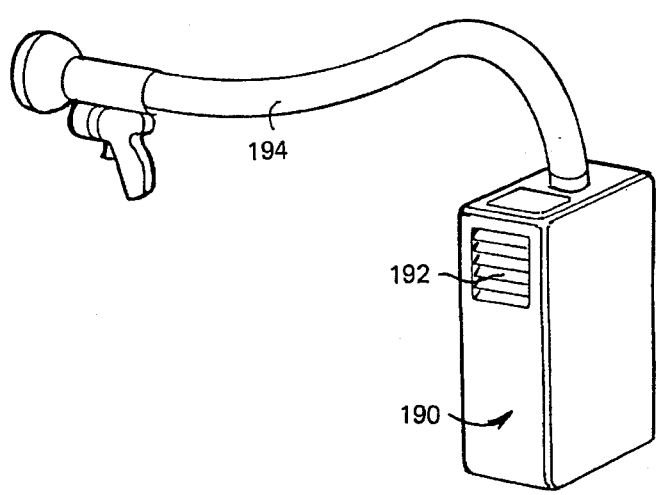
FIG. 16 illustrates the hedge cutter of FIG. 14 or FIG. 15 in one operational form with the receptacle vented.

FIG. 16 illustrates a particular arrangement of the cutting tool and receptacle 190 wherein the receptacle 190 is vented as at 192, the receptacle being connected to the tool via a flexible tube 194. This arrangement is shown as being suitable for use with the hedge trimmer of FIGS. 14 and 15.

The assisted air flow concept used in the embodiment of FIGS. 14, 15 and 16 can of cause be utilized in any of the aforementioned embodiments of the present invention, if so desired.

Figure 17:
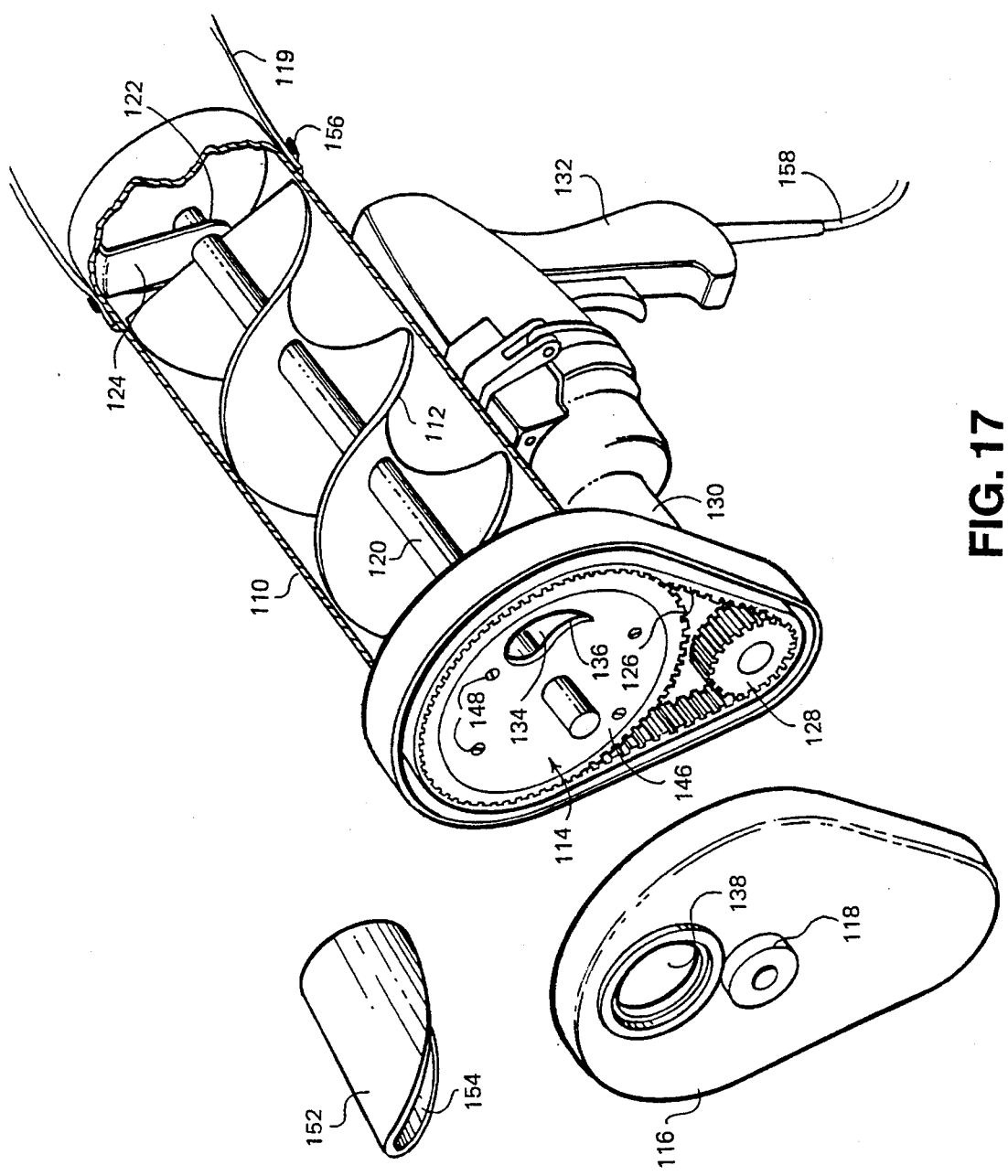
FIG. 17 is a partially cutaway view of a cutting tool constructed according to the present invention for use as a pruning tool.
Figure 18:
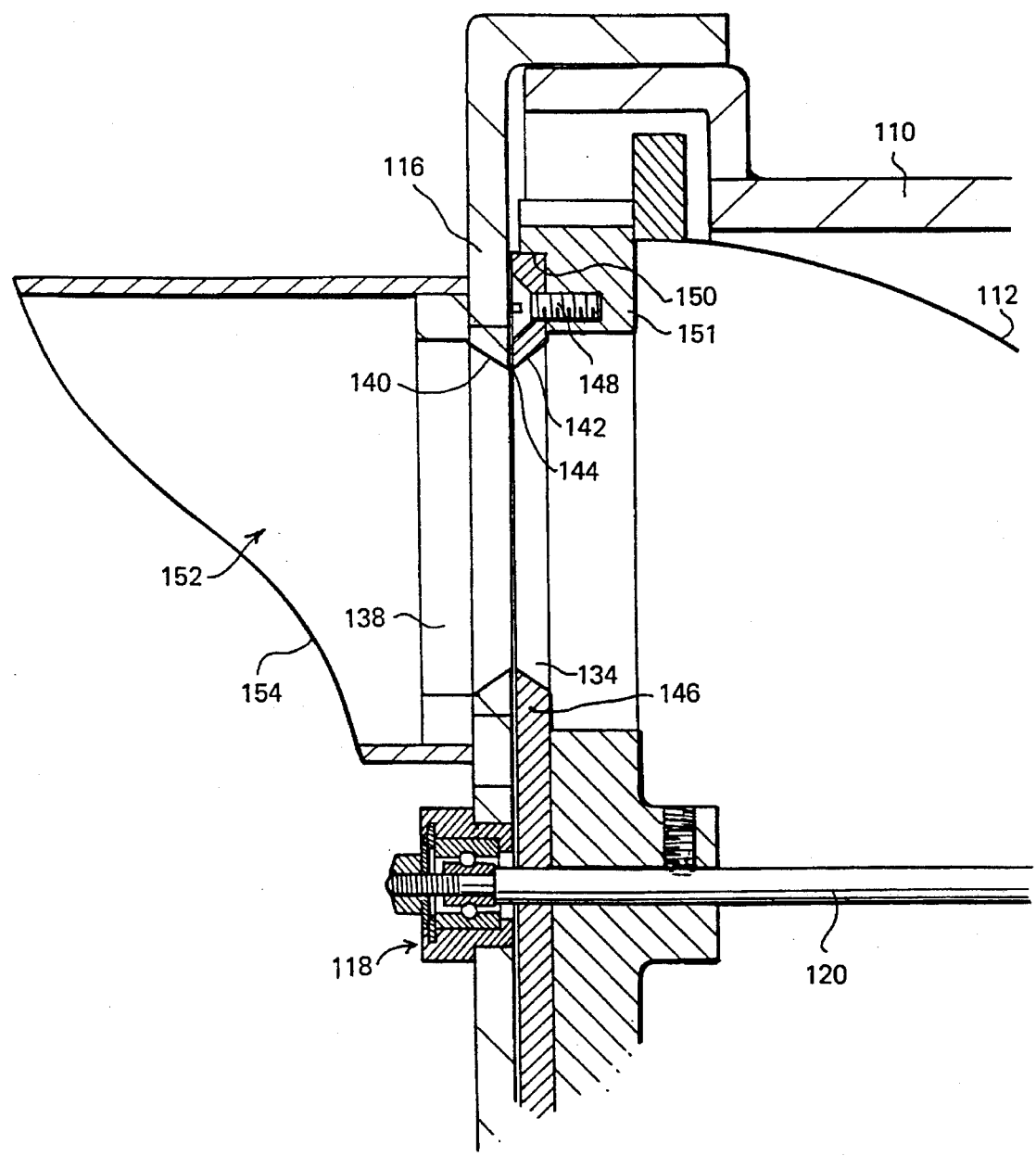
FIG. 18 is a general schematic cross-section of the drive arrangement of the pruning tool of FIG. 14.

FIGS. 17 and 18 of the accompanying drawings illustrate a pruning tool constructed in accordance with the present invention, the pruning tool comprising a cylindrical body 110 within which a helical screw impeller 112 and a cutting disc 114 are located. One end of the body 110 is normally closed by a drive cover 116 which supports a bearing 118 whilst the other open end of the body 110 is closed by a receptacle 119. The bearing 118 is located coaxially with the cylindrical body 110 and one end region of an axle 120 is freely rotatably located in the bearing 118. The cutting disc 114 and the screw impeller 112 are fixed on the axle 120 which extends coaxially within the body 110 through the centre of cutting disc 114 and the helical centre of the impeller, with the other end of the axle being supported in a further bearing 122 mounted on an arm 124 which extends from the wall of the body 110.

The perimeter of the cutting disc 114 forms a gripping surface for a continuous drive belt 126 which also engages around a smaller diameter drive wheel 128 arranged with its axis of rotation parallel to the axle 120 through spaced therefrom. The drive belt 128 is toothed on its inner surface to provide for positive grip with the peripheries of the cutting disc 114 and drive wheel 128 which carry substantially complementary teeth and spaces therebetween. Alternatively a chain and appropriate tooth can be substituted. The drive wheel 128 is connected to an adaptor 130 to which a conventional electric power drill 132 can be secured, operation of the power drill thus rotating the cutting disc 114 and impeller 112.

Found in the cutting disc 114 through offset from the centre thereof is a cutting aperture 134, the cutting aperture 134 being generally circular with a narrowing extension 136 extending circumferentially of the disc 114, the purpose of which extension being discussed later. A further cutting aperture 138 formed in the drive cover 116 is arranged to overlap the said cutting aperture 134, with said apertures 134,138 having like general diameters and being coaxially aligned with each other (see FIG. 18) at one point on the rotational path of the cutting disc 114. As best seen in FIG. 18, the respective cutting apertures have profiled edges 140, 142 which present a combined sharp cutting edge 144 which facilitates cutting/shearing. The cutting disc 114 is formed in two parts with the cutting aperture 134 being formed in one part which takes the form of a disc like plate 146 which is bolted by bolts 148 in a recess 150 on one face of the other part 151 of the disc 114. The further cutting aperture 138 in the drive cover 116 is circular and a guide 152 is secured therearound. The guide 152 is cylindrical and cutaway at an angle to its longitudinal axis as at 154, so that a user can see more accurately when a cut is to be made in a stem to be pruned.

In use a closed receptacle 119 in the form of a flexible, disposable plastics bag is detachably secured over the open end of the body 110, the bag being secured by a flexible broken annular ring 156. Then by connecting the power drill 132 to an electricity supply via cable 158 the drill can be operated to cause the cutting disc 114 and screw impeller to rotate at a relatively slow speed due to the small size of drive wheel 128 as compared to the diameter of cutting disc 114, but at a high torque and relatively quietly. By then locating the end of, for example, a rose tree stem in the guide 152 the stem enters the further cutting aperture 138 and when the said cutting apertures 134 of the cutting disc 114 rotates and overlaps the further cutting apertures the stem can be passed through both apertures into the body 110. Continued rotation of cutting disc 114 causes the stem to be moved with the extension 136 with the stem being cut/sheared by the respective aperture edges. The cut stem pellet is then physically moved by the screw impeller 112 along the body 110 and into the plastic bag 119. The cutting action thus prunes the stem into small pellet size lengths down to the required position, the cutting and collection of the pellet lengths of stem removing the possibility of injury from the sharp thorns present on rose tree stems. Also due to the high torque of the cutting action relatively thick stems can be pruned. Further due to the relatively slow rotation of the impeller 112 the collection bag 119 is not vented and thus the pruning tool can be utilised at any time without the usual ambient dust cloud of vented devices which can cause problems with eyes and clothing.

Figure 19:
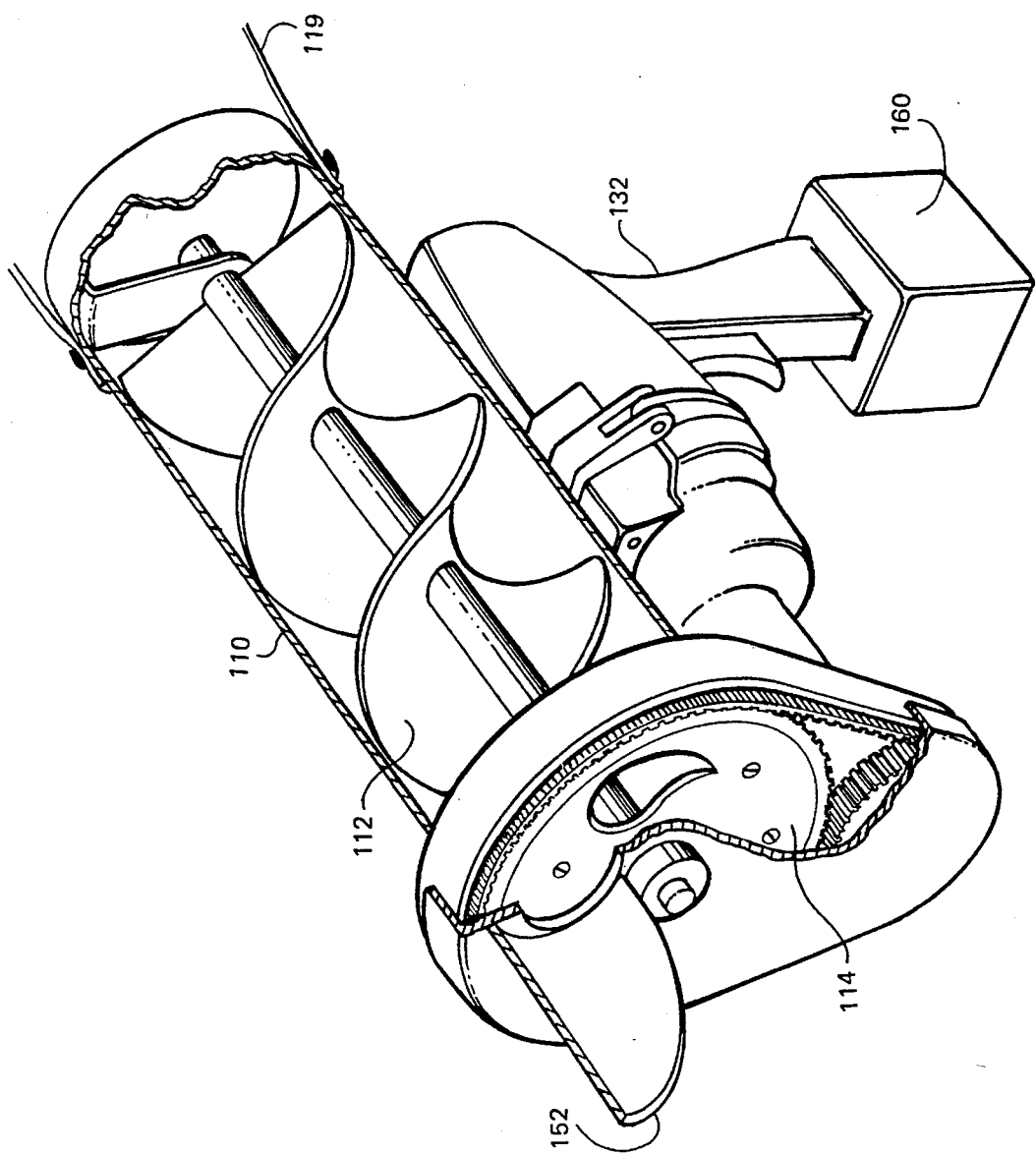
FIG. 19 is a partially cutaway view of a pruning tool constructed according to the present invention and powered by batteries.
Figure 20:
FIG. 20 illustrates the pruning tool of FIG. 16 in use.

A modified form of pruner is shown in FIG. 19, the power drill being powered by batteries 160. These batteries 160 are preferably rechargeable with the pruner being normally stored at a charging location ready for use. This modified pruner is shown in use in FIG. 20.

Figure 21:
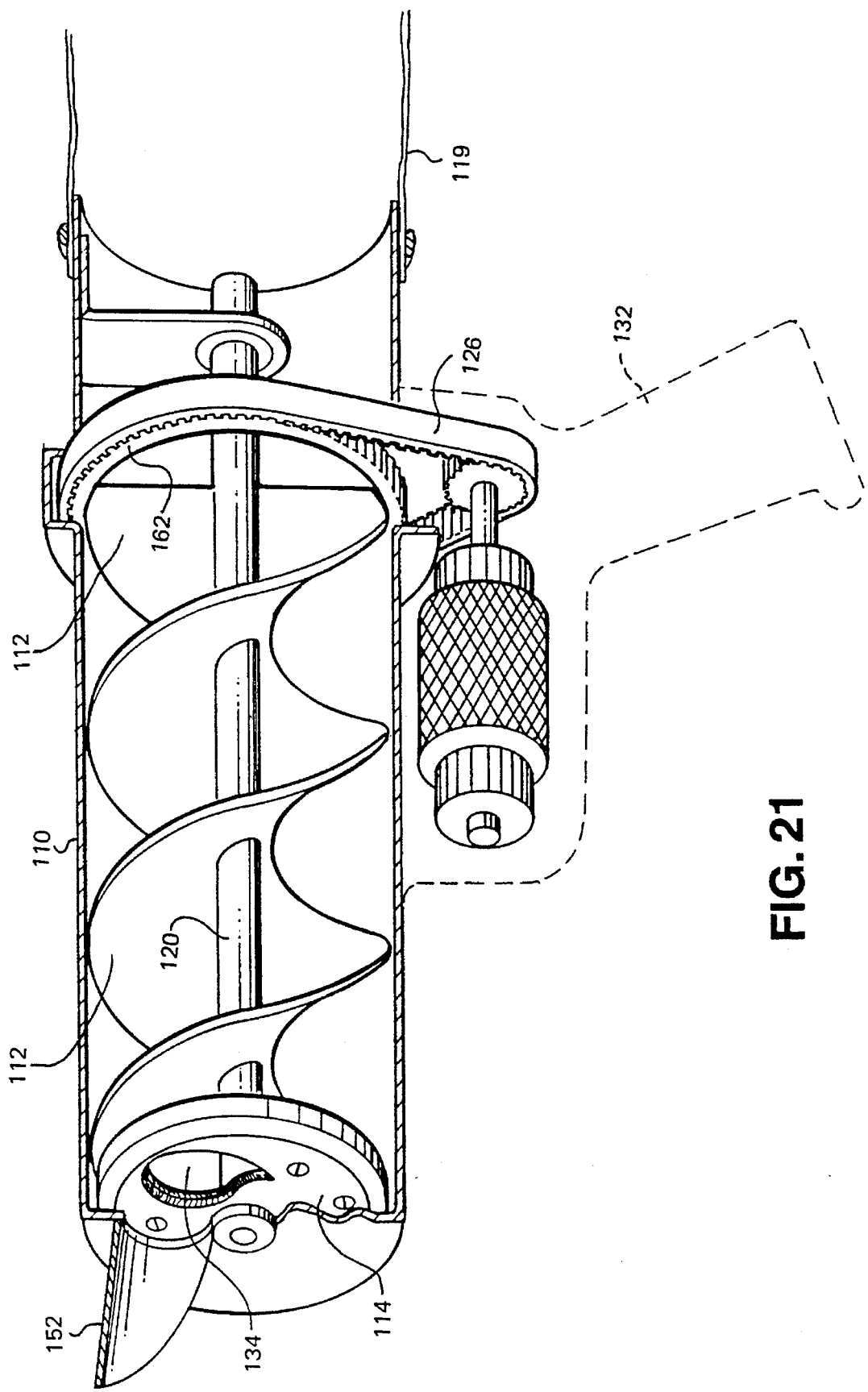
FIG. 21 is a partially cutaway view of a modified pruning tool constructed according to the present invention wherein the impeller is itself driven.

FIG. 21 of the accompanying drawings illustrates an alternative embodiment of pruning tool constructed according to the present invention. The sole difference from the pruner of FIGS. 17 and 18 is in the drive arrangement with the drive belt 126 engaging around a drive ring 162 secured to the periphery of the screw impeller 112 towards the open end of the body 110—the same reference numerals being used as in FIGS. 17 and 18 for like components. This construction has the advantages that the drive is towards the rear of the tool and thus the body 110 and cutting apertures can be relatively easily pushed into a bush or tree to access a stem to be pruned.

Whilst the above pruning tools constructed according to the present invention are described hereabove with detachable power drills attached to provide the necessary drive for the cutting action, the motors can alternatively be integrally manufactured with the tools as desired.

Whilst the pruning tools of FIGS. 17 to 21 utilize a sealed receptacle to advantage, a vented arrangement can be utilized with the pruning tools of FIGS. 17 to 21 being modified to have assisted air flow in a like manner to the hedge cutters of FIGS. 14 to 16.

The present invention thus provides a simple and safe-to-use cutting unit for use in cutting hedges or lawns, and for possible use in cutting and collecting other waste material.

I claim:

1. A cutting tool for use in the garden and workshops, comprising a body which houses a screw impeller which can be driven by a motor, the screw impeller being arranged to generate an air flow and to move waste along a flow path extending generally coaxial with the screw impeller, through the body from an inlet to an outlet, the outlet being connectable to a receptacle which is adapted to entrap any material extrained by the air flow, a cutting blade which is rotatable coaxially with the screw impeller being arranged to be driven by the screw impeller and being located adjacent to the inlet and aligned with a fixed cutting blade which is fixed relative to the body to cut material projecting therebetween, which cut material is entrained through the body by the screw impeller and collected in the receptacle.

2. A cutting tool according to claim 1, wherein the body houses the motor in a closed compartment.

3. A cutting tool according to claim 2, wherein the motor is arranged to directly drive the screw impeller and rotary cutting blade.

4. A cutting tool according to claim 1, wherein the assembly of the cutting blade is located within a guard portion of the body which is generally cylindrical and located at an axial end face of a cone shaped part of the guard portion.

5. A cutting tool according to claim 4, wherein the cylindrically shaped guard portion has an end wall, adjacent to the axial end face of the cone shape, which is cut away to define the inlet.

6. A cutting tool according to claim 4, wherein the cylindrical guard portion has an end wall which has a number of apertures which are opened or closed by the rotation of a closure member.

7. A cutting tool according to claim 1, wherein the body is a barrel shape.

8. A cutting tool according to claim 7, wherein the barrel shaped body has a side wall in which a "V" shaped cut away defines the inlet.

9. A cutting tool according to claim 1, wherein the flow path between the inlet and outlet is smooth and continuous.

10. A cutting tool according to claim 1, wherein an air flow induction arrangement is provided for inducing a flow of air from the inlet to the outlet to assist the entrainment of waste.

11. A cutting tool according to claim 10, wherein a fan of the air flow induction arrangement introduces an air flow into the said body part way along the length of the screw impeller.

12. A cutting tool according to claim 10, wherein said air flow induction arrangement introduces an air flow into said body adjacent to said inlet.

13. A garden mower incorporating a cutting tool comprising a body which houses a screw impeller which can be driven by a motor, the screw impeller being arranged to generate an air flow and to move waste along a flow path extending generally coaxially with the impeller, through the body from an inlet to an outlet, the outlet being connectable to a receptacle adapted to entrap any material entrained by the air flow, a cutting blade which is rotatable coaxially with the screw impeller being arranged to be driven by the screw impeller and being located adjacent to the inlet and aligned with a fixed cutting blade which is fixed relative to the body to cut material projecting therebetween, which cut material is entrained through the body by the screw impeller and collected in the receptacle in which the cutting tool is retractable to position above a lawn surface, the cutting assembly being mounted on a pivotable arm which is spring biassed to the retracted position and pivotable to an operational position by remote control means.

14. A mower according to claim 13, wherein an air flow induction arrangement is provided for creating a flow of air from the inlet to the outlet to assist the entrainment of waste.

15. A mower according to claim 14, wherein a fan of the air flow induction arrangement introduces a flow of air into the body part way along the length of the screw impeller.

16. A mower according to claim 14, wherein the air flow induction arrangement introduces a flow of air into the body adjacent to the inlet.

17. A cutting tool for use in the garden and workshops, comprising a body which houses a screw impeller which can be driven by a motor, the screw impeller being arranged to generate an air flow and to move waste along a flow path extending generally coaxially with the screw impeller, through the body from an inlet to an outlet, the outlet being connectable to a receptacle adapted to entrap any material entrained by the air flow, a cutting blade which is rotatable coaxially with the screw impeller being arranged to be driven by the screw impeller and being located adjacent to the inlet and aligned with a fixed cutting blade which is fixed relative to the body to cut material projecting therebetween, which cut material is entrained through the body by the screw impeller and collected in the receptacle, assembled along with another identical tool, in a wheeled carrier to form a lawn mower having a handle to which a waste receptacle is attached.

18. A lawn mower according to claim 17, wherein the identical cutting tools are mounted on pivotal arms enabling either tool to assume a 45 degree angle to cut lawn edges.

19. A tool according to claim 17, wherein an air flow induction arrangement is provided for creating a flow of air from the inlet to the outlet to assist the entrainment of waste.

20. A tool according to claim 19, wherein a fan of the air flow induction arrangement introduces a flow of air into the body part way along the length of the screw impeller.

21. A mower according to claim 19, wherein the air flow induction arrangement introduces a flow of air into the body adjacent to inlet.

22. A cutting tool for use in the garden and workshops, comprising a body which houses a screw impeller which can be driven by a motor, the screw impeller being arranged to generate an air flow and to move waste along a flow path extending generally coaxially with the crew impeller, through the body from an inlet to an outlet, the outlet being connectable to a receptacle adapted to entrap any material by the air flow, a cutting blade which is rotatable coaxially with the screw impeller being arranged to be driven by the screw impeller and being located adjacent to the inlet and aligned with a fixed cutting blade which is fixed relative to the body to cut material projecting therebetween, which cut material is entrained through the body by the screw impeller and collected in the receptacle, with a brush/shredding attachment which is driven by helical gears located at an end of the screw impeller, to thus produce a sweeping and shredding action.

23. A tool according to claim 22, wherein an air flow induction arrangement is provided for creating a flow of air from the inlet to the outlet to assist the entrainment of waste.

24. A mower according to claim 23, wherein a fan of the flow of air induction arrangement introduces a flow of air into the said body part way along the length of the screw impeller.

25. A mower according to claim 23, wherein the air flow induction arrangement introduces a flow of air into the body adjacent to the inlet.

26. A cutting tool according to claim 22, wherein the receptacle is vented.

27. A cutting tool according to claim 1, wherein the screw impeller extends on a flexible helix rotating in a flexible waste transfer tube connected between an outlet from the body and the receptacle.

28. A cutting tool according to claim 1, wherein the receptacle is unvented.

29. A cutting tool according to claim 1, wherein the screw impeller and cutting blade are secured on a freely rotatable axle.

30. A cutting tool according to claim 29, wherein a drive belt connects the motor to the cutting blade.

31. A cutting tool according to claim 29, wherein a drive belt connects the motor to the screw impeller.

32. A cutting tool according to claim 29, wherein the cutting blade comprises an edge of a cutting aperture provided at an offset location on a cutting disc mounted in the axle, and wherein the fixed cutting blade comprises an edge of an additional cutting aperture provided in an end wall of the body so that the additional cutting aperture defines the inlet.

33. A cutting tool according to claim 32, wherein a guide is provided in the body to guide material to be cut into the inlet.

34. A cutting tool according to claim 32, wherein a drive belt engages around a periphery of the cutting disc and a drive wheel which is connectable to the motor, the drive wheel having a smaller diameter than the cutting disc.

35. A cutting tool according to claim 32, wherein a drive belt engages around a periphery of a drive ring which is secured around the screw impeller, and a drive wheel which is connectable to the motor, the drive wheel having a smaller diameter than the cutting disc.

36. A mower according to claim 32, wherein an air flow induction arrangement is provided for creating a flow of air from the inlet to the outlet to assist the entrainment of waste.

37. A mower according to claim 36, wherein a fan of the air flow induction arrangement introduces a flow of air into the said body part way along the length of the screw impeller.

38. A mower according to claim 36, wherein said air flow induction arrangement introduces a flow of air into said body adjacent to said inlet.

* * * * *